UNITED STATES PATENT OFFICE.

JEROME JOHN COLLINS, OF WINSFORD, ENGLAND.

PURIFICATION OF TIN.

1,414,257.  Specification of Letters Patent.  Patented Apr. 25, 1922.

No Drawing.  Application filed November 1, 1920. Serial No. 421,068.

*To all whom it may concern:*

Be it known that I, JEROME JOHN COLLINS, a subject of the King of Great Britain and Ireland, and resident of Field House, Winsford, Cheshire, England, have invented certain new and useful Improvements Relating to the Purification of Tin, of which the following is a specification.

This invention has for its object to provide a simple and effective process for the purification of tin from the impurities, such as bismuth, lead, copper, antimony, arsenic, iron, etc., which are frequently associated therewith.

In accordance with my invention, the impure tin is placed in a solution of tin chloride to which chlorine gas is admitted, the chlorine acting to produce stannic chloride which immediately dissolves tin, so again producing stannous chloride, whereby a continuous dissolving of the tin by chlorine is effected by way of the tin chloride which is prevented from becoming too concentrated and so crystallizing out or solidifying by the addition of water to the solution.

In one convenient application of my invention, the process is carried out continuously, impure tin in a finely divided form, chlorine gas and water being fed into a reaction vessel containing stannic chloride, the stannous chloride liquor produced and the residues being drawn off as required. It is important that there shall always be an excess of tin in the reaction vessel. With this process, it is only necessary to add sufficient water to prevent the liquor becoming so concentrated as to cause crystallization in the reaction vessel. The chlorine is fed into the vessel at a rate which is not sufficient to cause boiling of the liquid due to the heat generated during the reaction of the chlorine upon the impure tin.

The excess of tin in the reaction vessel causes the precipitation of the chlorides of arsenic and antimony as insoluble oxychlorides and also the precipitation as metal of any bismuth present. Lead chloride which is dissolved by the hot liquid, precipitates when the latter is cooled.

The tin may be recovered from the stannous chloride by any convenient and suitable process, such as, for example, by electrolysis, or by replacement of the tin by zinc, so liberating the tin. Or the stannous chloride itself or any salt of tin which may be readily produced may be dealt with as the commercial product.

The residue from the reaction vessel may be treated in any known manner for the separation of its constituent metals.

I claim—

In the purification of tin, the improved process of obtaining stannous chloride consisting in admitting impure tin, chlorine gas and water to a reaction vessel containing tin chloride, and drawing off the liquor from the vessel as the process proceeds, as set forth.

In testimony whereof I have signed my name to this specification.

JEROME JOHN COLLINS.